United States Patent
Kaushik et al.

(10) Patent No.: US 11,812,261 B2
(45) Date of Patent: Nov. 7, 2023

(54) SYSTEM AND METHOD FOR PROVIDING A SECURE VLAN WITHIN A WIRELESS NETWORK

(71) Applicant: SOPHOS LIMITED, Abingdon (GB)

(72) Inventors: Anil Kaushik, Karnataka (IN); Rishikesh Basu, Bengaluru (IN); Pragada Kranthi Kiran Dharani, Bangalore (IN); Sathwikh Gopady Narasimha, Koteshwara (IN)

(73) Assignee: Sophos Limited, Abingdon (GB)

(*) Notice: Subject to any disclaimer, the term of this patent is extended or adjusted under 35 U.S.C. 154(b) by 0 days.

(21) Appl. No.: 17/709,962

(22) Filed: Mar. 31, 2022

(65) Prior Publication Data

US 2022/0232378 A1    Jul. 21, 2022

Related U.S. Application Data

(62) Division of application No. 16/757,712, filed as application No. PCT/US2018/057611 on Oct. 25, 2018.

(30) Foreign Application Priority Data

Oct. 26, 2017    (IN) .............................. 201711038045

(51) Int. Cl.
*H04W 12/06* (2021.01)
*H04W 12/42* (2021.01)
*H04L 12/46* (2006.01)

(52) U.S. Cl.
CPC ......... *H04W 12/06* (2013.01); *H04L 12/4641* (2013.01); *H04W 12/42* (2021.01)

(58) Field of Classification Search
CPC .... H04W 12/06; H04W 12/42; H04L 12/4641
See application file for complete search history.

(56) References Cited

U.S. PATENT DOCUMENTS

| 7,194,622 | B1 | 3/2007 | Halasz et al. | |
|---|---|---|---|---|
| 8,966,075 | B1* | 2/2015 | Chickering | H04L 63/10 709/227 |
| 2005/0174962 | A1 | 8/2005 | Gurevich | |
| 2005/0174963 | A1 | 8/2005 | Hsu | |
| 2007/0081477 | A1* | 4/2007 | Jakkahalli | H04L 12/4645 370/310 |
| 2008/0247368 | A1* | 10/2008 | Uppala | H04W 12/50 370/338 |

FOREIGN PATENT DOCUMENTS

EP    1 570 625    9/2005

OTHER PUBLICATIONS

"First Examination Report in IN Application No. 201711038045", dated Aug. 11, 2020, 7 pages.
"International Search Report and Written Opinion in International Application No. PCT/US2018/057611, filed Oct. 25, 2018", dated Jan. 29, 2019, 12 pages.

(Continued)

*Primary Examiner* — Amal S Zenati
(74) *Attorney, Agent, or Firm* — IP Spring

(57) ABSTRACT

Methods, systems and computer readable media for secure VLAN within a wireless network are described.

14 Claims, 6 Drawing Sheets

(56) References Cited

OTHER PUBLICATIONS

"Non-Final Office Action in U.S. Appl. No. 16/757,712", dated Feb. 16, 2022, 16 Pages.
Al-Hazmi, et al., "Virtualization of 802.11 interfaces for Wireless Mesh Networks", Wireless On-Demand Network Systems and Services (WONS), 2011 Eighth International Conference On, IEEE, Jan. 26, 2011, pp. 44-51.
IPRP, "International Preliminary Report on Patentability in Intern. Appn. No. PCT/US2018/057611", dated May 7, 2020, 10 pages.
IPO, Notice of Hearing for Indian Patent Application No. 201711038045, dated Oct. 12, 2022, 2 pages.

* cited by examiner

SYSTEM AND METHOD FOR PROVIDING A SECURE VLAN WITHIN A WIRELESS NETWORK

RELATED APPLICATIONS

This application is a divisional of U.S. application Ser. No. 16/757,712, filed Apr. 20, 2020, which is a national phase of International Application No. PCT/US2018/057611, filed Oct. 25, 2018 which claims priority to IN Application No. 201711038045, filed Oct. 26, 2017, the contents of which are incorporated herein by reference in their entirety.

TECHNICAL FIELD

Embodiments relate generally to wireless computer networks, and more particularly, to methods, systems and computer readable media for providing a secure Virtual Local Area Network (VLAN) within a wireless network.

BACKGROUND

A basic function of a VLAN is to provide segregation of network traffic. However in wireless networks, VLANs have also been used to provide priority mapping (e.g., quality of service (QoS) according to IEEE P802.1P) to Wi-Fi multimedia (WMM) priorities. For example, priorities can be defined at a VLAN aware switch. A wireless access point can use the VLAN tagged packet and map 802.1P QoS priority from the packet to WMM priorities.

Isolating traffic at wireless level can be a challenge because the radio frequency (RF) medium is common for all the VLANs. Some existing wireless vendors may not provide functionality for broadcast and multicast traffic to be isolated at the VLAN level, which may expose a security vulnerability in some networks.

Embodiments were conceived in light of the above mentioned needs, challenges and/or limitations, among other things.

SUMMARY

In general, some implementations may provide secure VLANs in a wireless network setting to prevent data crossover from one VLAN to another within the wireless network.

One or more embodiments may include methods, systems and computer readable media for providing a secure VLAN in a wireless network environment. In some implementations, a method may include receiving, at a wireless device, an authentication request from a client device, and performing, at the wireless device, an authentication of the client device based on the authentication request. The method can also include transmitting, from the wireless device to the client device, a response to the authentication request, and receiving, at the wireless device, an association request from the client device. The method can further include transmitting, from the wireless device to the client device, a response to the association request, and when authentication and association have been successfully completed, assigning, at the wireless device, the client device to a virtual network.

The method can also include determining, at the wireless device, whether a virtual wireless interface has been instantiated for the virtual network, and, when it is determined that the virtual wireless interface has been instantiated for the virtual network: binding the client device to the virtual wireless interface, and permitting the client device to communicate data via the virtual wireless interface.

The method can further include when it is determined that the virtual wireless interface has not been instantiated for the virtual network: instantiating a new virtual wireless interface, and binding the new virtual wireless interface to the client device.

The wireless device can include an access point. The authentication can include an extensible authentication protocol sequence. The virtual network can include a virtual local area network. The virtual wireless interface can include a virtual access point radio interface.

The method can also include leaving the authentication incomplete by the wireless device not responding to client messages relating to the authentication. The method can further include receiving, at the wireless device, a broadcast probe message transmitted by the client device, wherein the client device transmits the broadcast probe message in response to receiving no response from the wireless device to client messages relating to the authentication. The method can also include sending a response, from the wireless device to the client device, wherein the response includes an identifier associated with the virtual network. The identifier can include a basic service set identifier (BSSID) associated with the virtual network.

Some implementations can include a method comprising receiving, at a wireless device, an authentication request from a client device, and performing, at the wireless device, an authentication of the client device based on the authentication request. The method can also include transmitting, from the wireless device to the client device, a response to the authentication request, and receiving, at the wireless device, an association request from the client device.

The method can further include transmitting, from the wireless device to the client device, a response to the association request, and assigning, at the wireless device, the client device to a virtual network. The method can also include determining, at the wireless device, whether a key has been previously established for the virtual network, and when it is determined that a key has been previously established for the virtual network, providing the key to the client device. The method can also include when it is determined that a key has not been previously established for the virtual network, establishing a new key and providing the new key to the client device.

The wireless device can include an access point. The authentication can include an extensible authentication protocol sequence. The virtual network can include a virtual local area network. The key can include a group temporal key (GTK).

Some implementations can include a wireless device comprising one or more processors, and a nontransitory computer readable medium coupled to the one or more processors, the nontransitory computer readable medium having stored thereon software instructions that, when executed by the one or more processors, causes the one or more processors to perform operations.

The operations can include a) receiving, at the wireless device, an authentication request from a client device and performing an authentication of the client device based on the authentication request, and b) transmitting, from the wireless device to the client device, a response to the authentication request. The operations can also include c) receiving, at the wireless device, an association request from the client device, and d) transmitting, from the wireless device to the client device, a response to the association request.

The operations can further include e) when authentication and association have been successfully completed, assigning, at the wireless device, the client device to a virtual network, and f) determining, at the wireless device, whether a virtual wireless interface has been instantiated for the virtual network. The operations can also include g) when it is determined that the virtual wireless interface has been instantiated for the virtual network: binding the client device to the virtual wireless interface, and permitting the client device to communicate data via the virtual wireless interface.

The operations can further include h) when it is determined that the virtual wireless interface has not been instantiated for the virtual network: instantiating a new virtual wireless interface, and binding the new virtual wireless interface to the client device.

The wireless device can include an access point. The authentication can include an extensible authentication protocol sequence. The virtual network can include a virtual local area network. The virtual wireless interface can include a virtual access point. The operations can further include: leaving the authentication incomplete by the wireless device not responding to client messages relating to the authentication, and receiving, at the wireless device, a broadcast probe message transmitted by the client device, wherein the client device transmits the broadcast probe message in response to receiving no response from the wireless device to client messages relating to the authentication. The operations can also include sending a response, from the wireless device to the client device, wherein the response includes an identifier associated with the virtual network.

The identifier can include a basic service set identifier (BSSID) associated with the virtual network. The operations further include repeating a)-h) using the BSSID associated with the virtual network.

DETAILED DESCRIPTION

In general, some implementations can help reduce threats by ensuring that network traffic cannot be snooped across VLANs, even if clients of the respective VLANs are connected to the same wireless access point. For example, two wireless clients can be connected to the same AP and may be assigned to different wireless VLANs. A different group key may be used for each VLAN and each VLAN may have a different BSSID. The group key for each VLAN, and associated encryption using the group key, helps ensure that traffic cannot be snooped across VLANs, even though they are connected to the same access point.

Figure 1:
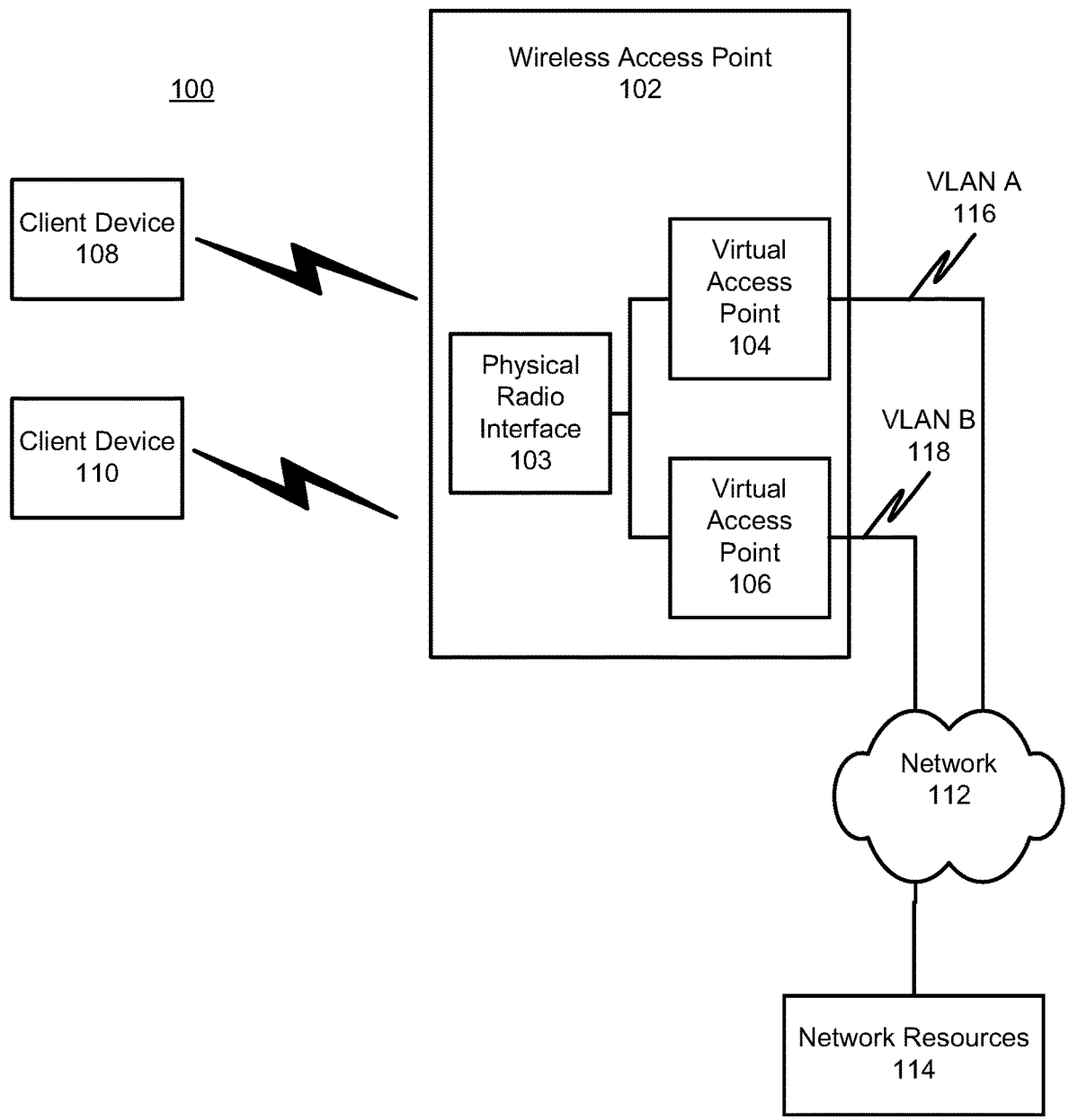
FIG. 1 is a diagram of an example wireless network environment in accordance with some implementations.

FIG. 1 is a diagram of an example wireless network environment 100 in accordance with some implementations. The wireless network environment 100 includes a wireless access point (AP) 102 having a physical radio interface 103, a first virtual access point 104, a second virtual access point 106. The environment 100 also includes a first client device 108, a second client device 110, a network 112, one or more network resources 114, a first VLAN 116 ("VLAN A") and a second VLAN 118 ("VLAN B").

In operation, the virtual access point 102 can provide a secure VLAN in a wireless network setting according to one or more of the techniques described below in conjunction with FIGS. 2 and 3.

Figure 2:
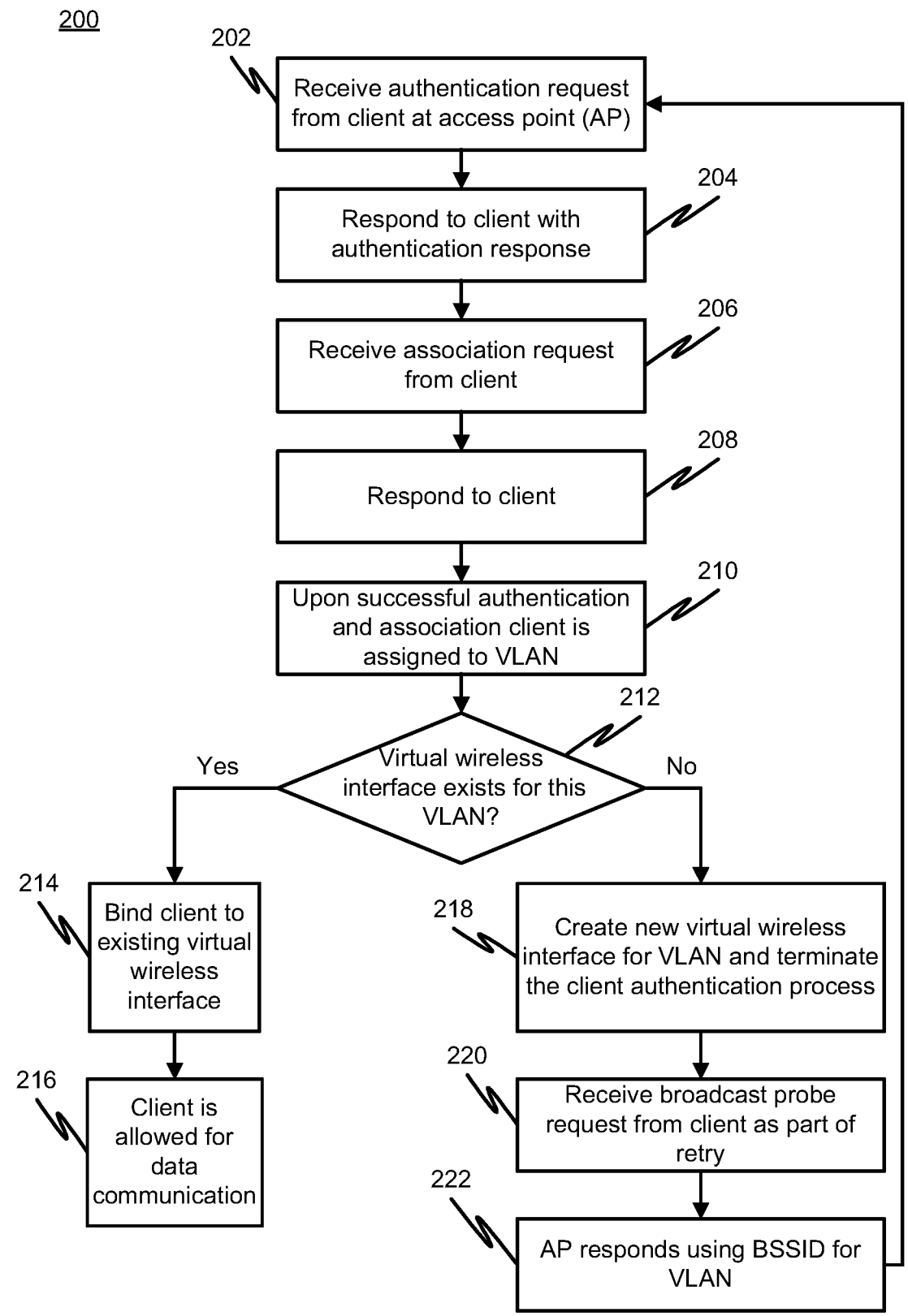
FIG. 2 is a flowchart showing an example method for secure VLAN in a wireless network in accordance with some implementations.

FIG. 2 is a flowchart showing an example method 200 for providing a secure VLAN within a wireless network. The method begins at 202, where an authentication request is received at a wireless device (e.g., a wireless access point, such as 202) from a client device (e.g., 108 or 110) seeking access to the wireless network and/or other networks or resources connected to the wireless network (e.g., 112 and/or 114). The authentication request can include authentication credentials (e.g., user name and password). Processing continues to 204.

At 204, an authentication response is sent to the client device. The authentication response can include an indication that authentication was verified and access to the wireless network has been granted, or the response can include an indication that access has not been granted. Processing continues to 206.

At 206, an association request is received from the client. The association request can include a request for the client to be associated with a particular access point (AP). The association request can also include chosen encryption types and other compatible capabilities (e.g., other 802.11 capabilities). Processing continues to 208.

At 208, the AP for which an association request from the client was received responds to the client. For example, if the elements in the association request match the capabilities of the AP, the AP can create an Association ID for the client device (or mobile station) and respond with an association response with a success message granting network access to the client device. Processing continues to 210.

At 210, upon successful authentication and association, the client is assigned to a VLAN. For example, in a RADIUS-based VLAN assignment, a "RADIUS accept" packet will have VLAN information for a particular username. In the case of Role Based VLAN assignment, the LDAP protocol can provide the VLAN information based on the department, location etc.

A user can also configure the VLAN for particular MAC, OS, etc. in the system.

In some cases, a VLAN may be assigned based on a device type. For example, a device recognized as a Windows device, based on MAC address, information in the request, etc. may be assigned to one VLAN, Apple devices assigned to another VLAN, and Linux devices assigned to another VLAN. Control of the devices may be maintained in a particular manner.

In some cases, a VLAN may be assigned to a device based on the user or group of the user. For example, finance personnel may be assigned to one VLAN, members of human resources department may be assigned to another VLAN, and members of the sales department assigned to another VLAN. Thus, the resources available to each VLAN may be restricted by group, limiting the exposure of a compromise to a group.

In some implementations, authentication for a user or for a device may be provided. In some implementations, a security module on a device provides authentication information that may be used to authenticate the user and/or the device. The security module may be secured by various techniques so that it can provide a trusted authentication of the user and/or device. For example, a second factor of authentication may be used for VLAN access, such as a hash or encryption performed with a key known to the device, the use of a security token provided by a security device, or the confirmation of an authentication request via a separate channel such as a request sent to an email address, smartphone, wearable computer, and so on.

In some implementations, information about the status of the device, for example, health status, may be provided by a security module, and the status of the device may be used at least in part to assign the device to VLAN. For example, a security module may monitor the health status of a device. The health status may be communicated, and the health status as reported by the security module may be used to assign a device to a secure VLAN. For example, a device that meets security requirements confirmed by the security module (e.g., a good health report) may be assigned to a particular VLAN and a device that has one or more flagged security issues, such as software that is not up to date, a modified operating system, identified malware, etc., may be assigned to another VLAN.

For example, one VLAN may be subject to certain access restrictions or security requirements, and another VLAN may have different access or security requirements. For example, a particular VLAN may be used to access certain servers or other user's devices. Another VLAN may only allow communication through a firewall to less secure parts of the network, or only to the Internet.

Processing continues to 212.

At 212, it is determined whether a virtual wireless interface (e.g., virtual access point 104 or 106) exists for the VLAN the client has been assigned to. For example, the AP (e.g., 202) can determine whether any existing virtual wireless interface (e.g., virtual access points 104 or 106) is associated with the VLAN the client has been assigned to. When user assigns the WLAN Profile (SSID) to AP, a Virtual access point with Default VLAN is created. In some implementations, a virtual access point can persist as long as the user removes the WLAN profile for default VLAN and for new Virtual Access Point with VLANs, the virtual access point can persist until the last client is disconnected. There may be a limitation for the number of virtual access points created on a system. For example, there may not be more than 3 VLANs created in a deployment. If a virtual wireless interface exists, then processing continues to 214, otherwise processing continues to 218.

At 214, the AP binds the client to the existing virtual wireless interface associated with the VLAN that the client was assigned to. For example, after the association, if the virtual access point for wireless exists, then the client can be allowed to connect to the virtual access point without terminating the connection. The client can have communication through the virtual access point. Processing continues to 216.

At 216, the client is allowed to exchange data via the VLAN the client was assigned to.

At 218, the AP creates a new virtual wireless interface. The AP associates the new virtual wireless interface with the VLAN that the client has been assigned to and terminates the client authentication process. For example, an authentication process can be terminated by initiating a disassociation or de-authentication from a virtual access point. Processing continues to 220.

At 220, the AP receives a broadcast probe request from the client as part of a retry attempt. For example, the broadcast probe request can include a type of 802.11 management frame which is used to scan the available wireless network. Processing continues to 222.

At 222, the AP responds to the client with the BSSID of the VLAN the client was assigned to and that is now associated with the VLAN the client is assigned to. The process continues back to 202. For example, when a client with a non-default VLAN connects for the first time, the process can proceed from 218 to 222 and back to 202. When the process starts from 202 (e.g., second time), the process can proceed from 214 to 216. If the second client connects with the same VLAN, then the process can proceed from 214 to 216, otherwise, from 218 to 222 and back to 202.

Figure 3:
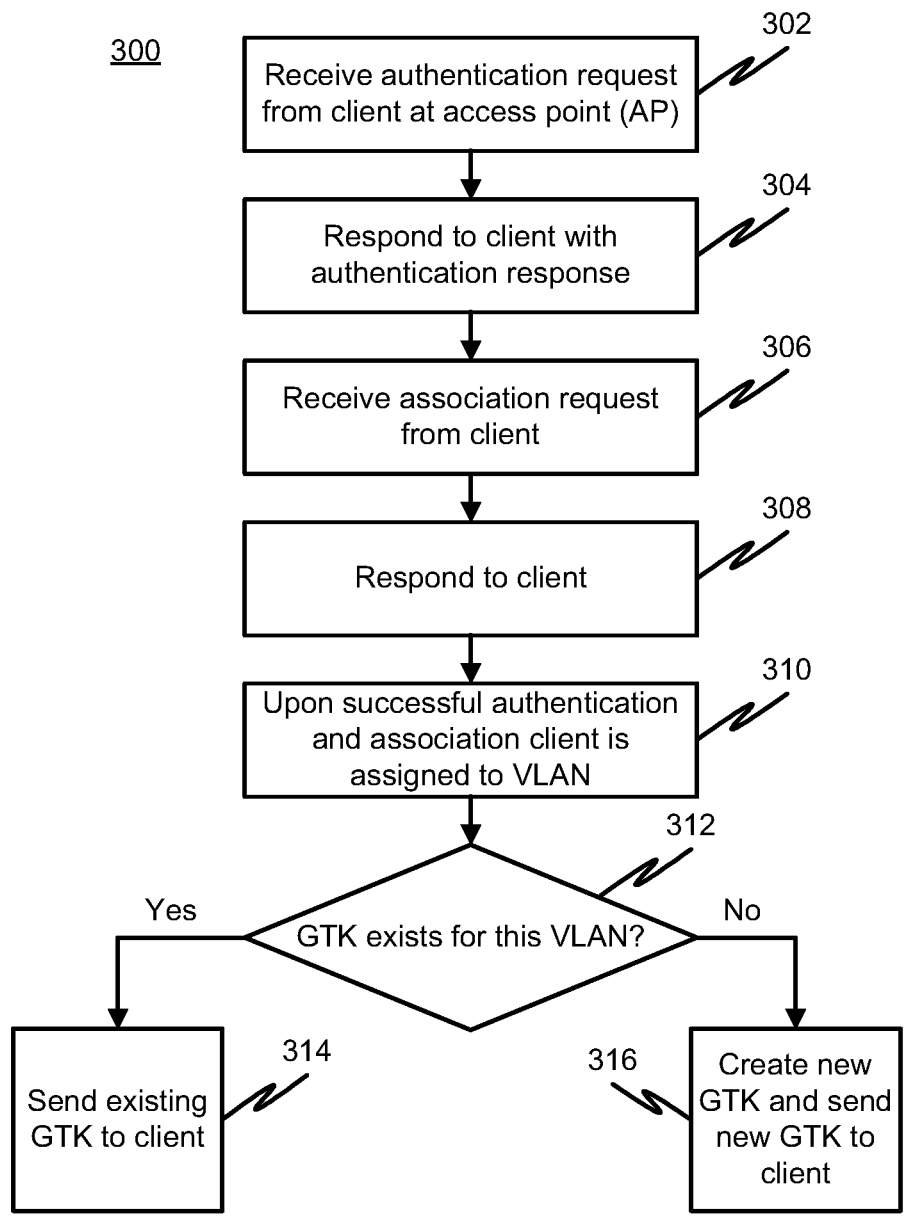
FIG. 3 is a flowchart showing an example method for secure VLAN in a wireless network in accordance with some implementations.

FIG. 3 is a flowchart showing an example method 300 for secure VLAN in a wireless network. Processing begins at 302, where an authentication request is received at a wireless device (e.g., a wireless access point, such as 202) from a client device (e.g., 108 or 110) seeking access to the wireless network and/or other networks or resources connected to the wireless network (e.g., 112 and/or 114). The authentication request can include authentication credentials (e.g., user name and password). Processing continues to 304.

At 304, an authentication response is sent to the client device. The authentication response can include an indication that authentication was verified and access to the wireless network has been granted, or the response can include an indication that access has not been granted. Processing continues to 306.

At 306, an association request is received from the client. The association request can include a request for the client to be associated with a particular access point (AP). The association request can also include chosen encryption types and other compatible capabilities (e.g., other 802.11 capabilities). Processing continues to 308.

At 308, the AP for which an association request from the client was received responds to the client. For example, if the elements in the association request match the capabilities of the AP, the AP can create an Association ID for the client device (or mobile station) and respond with an association response with a success message granting network access to the client device. Processing continues to 310.

At 310, upon successful authentication and association, the client is assigned to a VLAN. Processing continues to 312.

At 312, it is determined whether a group temporal key (GTK) exists for the VLAN the client has been assigned to (e.g., by searching for a GTK associated with the VLAN in an access point). A GTK can include a random value assigned by a broadcast or multicast source (e.g., the AP 202) and is used to protect broadcast/multicast medium access control (MAC) protocol data units from that source. The GTK is a temporal key, which is used to protect group addressed communication (multicast and broadcast). For example, GTKs can be used between a virtual access point and devices authenticated to it. The virtual access point can derive and store new GTKs when it needs to update the GTKs. The size of the GTK depends on the cipher suite (e.g., WEP, TKIP, CCMP and GCMP). If a GTK for the VLAN exists, then processing continues to 314, otherwise processing continues to 316.

At 314, the existing GTK for the VLAN the client is assigned to is sent to client. GTK creation can be independent of the clients assigned. A virtual access point may change the GTK on disassociation or de-authentication of an STA. The virtual access point might update the GTK for one of the following reasons: a) the virtual access point might change the GTK on disassociation or de-authentication of a STA; or an event within the SME might trigger a group key handshake. The client can then begin to encrypt/decrypt wireless data messages to the AP using the existing GTK.

At 316, a new GTK is created for the VLAN the client is assigned to and the new GTK is sent to the client. The client can then begin to encrypt/decrypt wireless data messages to the AP using the newly created GTK. The GTK is a random value which is used to protect broadcast/multicast traffic. The GTK may be derived from a group master key (GMK) using a Pseudo Random Function.

It will be appreciated that one or more of 202-222 and/or 302-316 may be repeated, performed in a different order or performed periodically.

Figure 4:
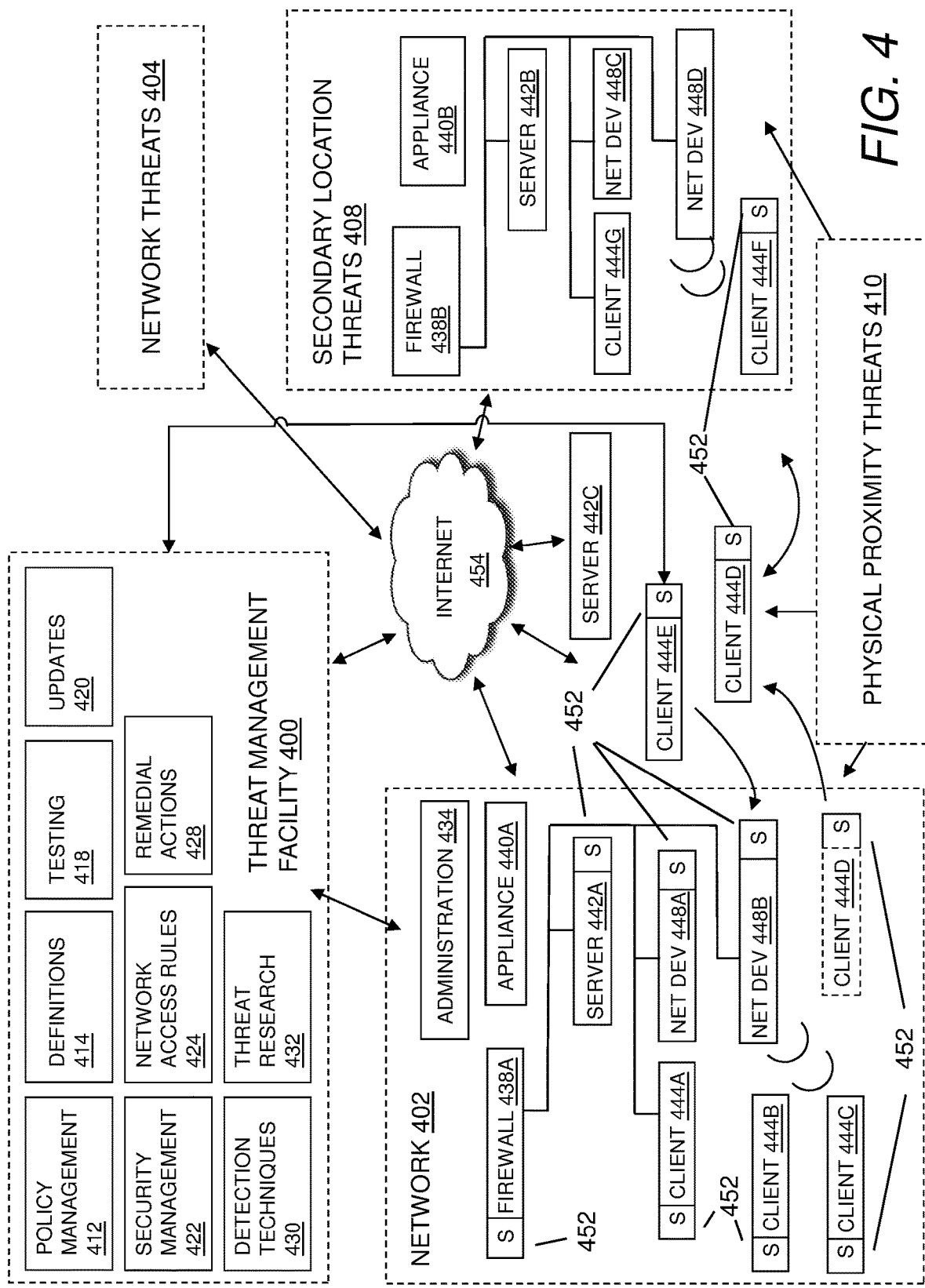
FIG. 4 is diagram of an example environment for threat management.

FIG. 4 illustrates an environment for threat management. Specifically, FIG. 4 depicts a block diagram of a threat management facility 400 providing protection to one or more enterprises, networks, locations, users, businesses, etc. against a variety of threats—a context in which the techniques described above may usefully be deployed. The threat management facility 400 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g. employees, residents, users, guests, etc.) from accessing certain types of applications, devices, resources generally or in a particular manner. Policies may be created, deployed and managed, for example, through the threat management facility 400, which may update and monitor network devices, users, and assets accordingly.

The threat of malware or other compromises may be present at various points within a network 402 such as laptops, desktops, servers, gateways, communication ports, handheld or mobile devices, IoT devices, firewalls. In addition to controlling or stopping malicious code, a threat management facility 400 may provide policy management to control devices, applications, or users that might otherwise undermine productivity and network performance within the network 402.

The threat management facility 400 may provide protection to network 402 from computer-based malware, including viruses, spyware, adware, Trojans, intrusion, spam, policy abuse, advanced persistent threats, uncontrolled access, and the like. In general, the network 402 may be any networked computer-based infrastructure or the like managed by a threat management facility 402, such as an organization, association, institution, or the like, or a cloud-based facility that is available for subscription by individuals. For example, the network 402 may be a corporate, commercial, educational, governmental, or other network 402, and may include multiple networks, computing resources, and other facilities, may be distributed among more than one geographical locations, and may include administration 434, a firewall 438A, an appliance 440A, a server 442A, network devices 448A-B, clients 444A-D, such as IoT devices or other devices. It will be understood that any reference herein to a client or client facilities may include the clients 444A-D shown in FIG. 4 and vice-versa.

The threat management facility 400 may include computers, software, or other computing facilities supporting a plurality of functions, such as security management facility 422, policy management facility 412, update facility 420, a definitions facility 414, network access rules facility 424, remedial action facility 428, detection techniques facility 430, testing facility 418, a threat research facility 432, and the like. In embodiments, the threat protection provided by the threat management facility 400 may extend beyond the network boundaries of the network 402 to include clients 444D (or client facilities) that have moved into network connectivity not directly associated with or controlled by the network 402. Threats to client facilities may come from a variety of sources, such as from network threats 404, physical proximity threats 410, secondary location threats 408, and the like. Clients 444A-D may be protected from threats even when the client 444A-D is not directly connected or in association with the network 402, such as when a client 444E-F moves in and out of the network 402, for example when interfacing with an unprotected server 442C through the Internet 454, when a client 444F is moving into a secondary location threat 408 network such as interfacing with components 440B, 442B, 448C, 448D that are not protected, and the like.

The threat management facility 400 may use or may be included in an integrated system approach to provide network 402 protection from a plurality of threats to device resources in a plurality of locations and network configurations. The threat management facility 400 may also or instead be deployed as a stand-alone solution. For example, some or all of the threat management facility 400 components may be integrated into a server or servers at a remote location, for example in a cloud computing facility. For example, some or all of the threat management facility 400 components may be integrated into a firewall, gateway, or access point within or at the border of the network 402. In some embodiments, the threat management facility 400 may be integrated into a product, such as a third-party product, e.g., through an application programming interface, which may be deployed on endpoints, on remote servers, on internal servers or gateways for a network, or some combination of these.

The security management facility 422 may include a plurality of elements that provide protection from malware to network 402 device resources in a variety of ways including endpoint security and control, email security and control, web security and control, reputation-based filtering, control of unauthorized users, control of guest and non-compliant computers, and the like. The security management facility 422 may include a local software application that provides protection to one or more network 402 devices. The security management facility 422 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 422 may provide email security and control. The security management facility 422 may also or instead provide for web security and control, such as by helping to detect or block viruses, spyware, malware, unwanted applications, and the like, or by helping to control web browsing activity originating from client devices. In an embodiment, the security management facility 422 may provide for network access control, which may provide control over network connections. In addition, network access control may control access to virtual private networks (VPN) that provide communications networks tunneled through other networks. The security management facility 422 may provide host intrusion prevention through behavioral based protection, which may guard against known or unknown threats by analyzing behavior before or while code executes. The security management facility 422 may provide reputation filtering, which may target or identify sources of code.

In embodiments, the security management facility 422 may provide secure VLANs in the wireless network (e.g., according to the methods described above regarding FIGS. 2 and 3). This aspect of the security management facility may also take place on the firewall 438A (e.g., an access point) or appliance 440A.

In general, the security management facility 422 may support overall security of the network 402 using the various techniques described above, optionally as supplemented by updates of malicious code information and so forth for distribution across the network 402.

The administration facility 434 may provide control over the security management facility 422 when updates are performed. Information from the security management facility 422 may also be sent from the enterprise back to a third party, a vendor, or the like, which may lead to improved performance of the threat management facility 400.

The threat management facility 400 may include a policy management facility 412 configured to take actions, such as to block applications, users, communications, devices, and so on based on determinations made. The policy management facility 412 may employ a set of rules or policies that determine network 402 access permissions for a client 444. In an embodiment, a policy database may include a block list, a black list, an allowed list, a white list, or the like, or combinations of the foregoing, that may provide a list of resources internal or external to the network 402 that may or may not be accessed by client devices 444. The policy management facility 412 may also or instead include rule-based filtering of access requests or resource requests, or other suitable techniques for controlling access to resources consistent with a corresponding policy.

In embodiments, the policy management facility 412 may include secure VLANs in a wireless network environment. The policy management facility may include policies to permit or deny access, to take remedial action, to issue alerts, and so on based on particular reliability index determinations.

The policy management facility 412 may also or instead provide configuration policies to be used to compare and control the configuration of applications, operating systems, hardware, devices, network associated with the network 402. An evolving threat environment may dictate timely updates, and thus an update management facility 420 may also be provided by the threat management facility 400. In addition, a policy management facility 412 may require update management (e.g., as provided by the update facility 420 herein described). In embodiments, the update management facility 420 may provide for patch management or other software updating, version control, and so forth.

The security facility 422 and policy management facility 412 may push information to the network 402 and/or a given client 444. The network 402 and/or client 444 may also or instead request information from the security facility 422 and/or policy management facility 412, network server facilities 442, or there may be a combination of pushing and pulling of information. In an embodiment, the policy management facility 412 and the security facility 422 management update modules may work in concert to provide information to the network 402 and/or client 444 facility for control of applications, devices, users, and so on.

As threats are identified and characterized, the threat management facility 400 may create updates that may be used to allow the threat management facility 400 to detect and remediate malicious software, unwanted applications, configuration and policy changes, and the like. The threat definition facility 414 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 422 when scanning files or applications within the client facility for the determination of malicious code that may be within the file or application. A definition management facility may include a definition for a neural network or other recognition engine. A definition management facility 414 may provide timely updates of definition files information to the network, client facilities, and the like.

The security management facility 422 may be used to scan an outgoing file and verify that the outgoing file is permitted to be transmitted per the enterprise facility 402 rules and policies. By checking outgoing files, the security management facility 422 may be able to discover malicious code infected files that were not detected as incoming files.

The threat management facility 400 may provide controlled access to the network 402. A network access rules facility 424 may be responsible for determining if a client facility 444 application should be granted access to a requested network resource. In an embodiment, the network access rules facility 424 may verify access rights for client facilities 444 to or from the network 402 or may verify access rights of computer facilities to or from external networks. When network access for a client facility is denied, the network access rules facility 424 may send an information file to the client facility, e.g., a command or command file that the remedial action facility 428 may access and take action upon. The network access rules facility 424 may include one or more databases that may include a block list, a black list, an allowed list, a white list, a reputation list, an unacceptable network resource database, an acceptable network resource database, a network resource reputation database, or the like. The network access rules facility 424 may incorporate rule evaluation. Rule evaluation may, for example, parse network access requests and apply the parsed information to network access rules. The network access rule facility 424 may also or instead provide updated rules and policies to the enterprise facility 402.

When a threat or policy violation is detected by the threat management facility 400, the threat management facility 400 may perform or initiate remedial action through a remedial action facility 428. Remedial action may take a variety of forms, such as terminating or modifying an ongoing process or interaction, issuing an alert, sending a warning to a client or administration facility 434 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 444, quarantining a related application (or files, processes or the like), terminating the application or device, isolating the application or device, moving a process or application code to a sandbox for evaluation, isolating the client facility 444 to a location or status within the network that restricts network access, blocking a network access port from a client facility 444, reporting the application to an administration facility 434, or the like, as well as any combination of the foregoing.

Remedial action may be provided as a result of a detection of a threat or violation. The detection techniques facility 430 may include tools for monitoring the network or managed devices within the network 402. The detection techniques facility 430 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 400 detects threats and violations to established policy, may require the ability to test the system, either at the system level or for a particular computing component. The testing facility 418 may allow the administration facility 434 to coordinate the testing of the security configurations of client facility computing facilities on a network. For example, the administration facility 434 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 434. The administration facility 434 may be able to determine the level of preparedness of the client facility 444 based on the reported information. Remedial action may be taken for any of the client facilities 444 as determined by the administration facility 434.

The threat management facility 400 may provide threat protection across the network 402 to devices such as clients 444, a server facility 442, an administration facility 434, a firewall 438, a gateway, one or more network devices (e.g., hubs and routers 448, a threat management or other appliance 440, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 402, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 402. The endpoint computer security facility 452 may be an application locally loaded onto any corresponding computer platform or computer support component, either for local security functions or for management by the threat management facility 400 or other remote resource, or any combination of these.

The network 402 may include a plurality of client facility computing platforms on which the endpoint computer security facility 452 is installed. A client facility computing platform may be a computer system that is able to access a service on another computer, such as a server facility 442, via a network. The endpoint computer security facility 452 may, in corresponding fashion, provide security in any suitable context such as among a plurality of networked applications, for a client facility connecting to an application server facility 442, for a web browser client facility connecting to a web server facility 442, for an e-mail client facility retrieving e-mail from an Internet 454 service provider's mail storage servers 442 or web site, and the like, as well as any variations or combinations of the foregoing.

The network 402 may include one or more of a variety of server facilities 442, such as application servers, communications servers, file servers, database servers, proxy servers, mail servers, fax servers, game servers, web servers, and the like. A server facility 442, which may also be referred to as a server facility 442 application, server facility 442 operating system, server facility 442 computer, or the like, may be any device(s), application program(s), operating system(s), or combination of the foregoing that accepts client facility connections in order to service requests from clients 444. In embodiments, the threat management facility 400 may provide threat protection to server facilities 442 within the network 402 as load conditions and application changes are made.

A server facility 442 may include an appliance facility 440, where the appliance facility 440 provides specific services to other devices on the network. Simple server facility 442 appliances may also be utilized across the network 402 infrastructure, such as switches, routers, hubs, gateways, print servers, modems, and the like. These appliances may provide interconnection services within the network 402, and therefore may advance the spread of a threat if not properly protected.

A client facility 444 may be protected from threats from within the network 402 using a local or personal firewall, which may be a hardware firewall, software firewall, or combination, that controls network traffic to and from a client. The local firewall may permit or deny communications based on a security policy. Another component that may be protected by an endpoint computer security facility 452 is a network firewall facility 438, which may include hardware or software, in a standalone device or integrated with another network component, that may be configured to permit, deny, or proxy data through a network 402.

The interface between the threat management facility 400 and the network 402, and through the appliance facility 440 to embedded endpoint computer security facilities, may include a set of tools that may be the same or different for various implementations, and may allow each network administrator to implement custom controls. In embodiments, these controls may include both automatic actions and managed actions. The administration facility 434 may configure policy rules that determine interactions. The administration facility 434 may also establish license management, which in turn may further determine interactions associated with licensed applications. In embodiments, interactions between the threat management facility 400 and the network 402 may provide threat protection to the network 402 by managing the flow of network data into and out of the network 402 through automatic actions that may be configured by the threat management facility 400 for example by action or configuration of the administration facility 434.

Client facilities 444 within the network 402 may be connected to the network 402 by way of wired network facilities 448A or wireless network facilities 448B. Mobile wireless facility clients 444, because of their ability to connect to a wireless network access point, may connect to the Internet 454 outside the physical boundary of the network 402, and therefore outside the threat-protected environment of the network 402. Such a client 444, if not for the presence of a locally-installed endpoint computer security facility 452, may be exposed to a malware attack or perform actions counter to network 402 policies. Thus, the endpoint computer security facility 452 may provide local protection against various threats and policy violations. The threat management facility 400 may also or instead be configured to protect the out-of-enterprise facility 402 mobile client facility (e.g., the clients 444) through interactions over the Internet 454 (or other network) with the locally-installed endpoint computer security facility 452. Thus mobile client facilities that are components of the network 402 but temporarily outside connectivity with the network 402 may be provided with the threat protection and policy control the same as or similar to client facilities 444 inside the network 402. In addition, mobile client facilities 444 may receive the same interactions to and from the threat management facility 400 as client facilities 444 inside the enterprise facility 402, such as by receiving the same or equivalent services via an embedded endpoint computer security facility 452.

Interactions between the threat management facility 400 and the components of the network 402, including mobile client facility extensions of the network 402, may ultimately be connected through the Internet 454 or any other network or combination of networks. Security-related or policy-related downloads and upgrades to the network 402 may be passed from the threat management facility 400 through to components of the network 402 equipped with the endpoint computer security facility 452. In turn, the endpoint computer security facility 452 components of the enterprise facility 102 may upload policy and access requests back across the Internet 454 and through to the threat management facility 400. The Internet 454 however, is also the path through which threats may be transmitted from their source, and an endpoint computer security facility 452 may be configured to protect a device outside the network 402 through locally-deployed protective measures and through suitable interactions with the threat management facility 400.

Thus, if the mobile client facility were to attempt to connect into an unprotected connection point, such as at a secondary location 408 hat is not a part of the network 402, the mobile client facility 444 may be required to request network interactions through the threat management facility 400, where contacting the threat management facility 400 may be performed prior to any other network action. In embodiments, the client facility's 444 endpoint computer security facility 452 may manage actions in unprotected network environments such as when the client facility (e.g., client 444F) is in a secondary location 408, where the endpoint computer security facility 452 may dictate what applications, actions, resources, users, etc. are allowed, blocked, modified, or the like.

The secondary location 408 may have no endpoint computer security facilities 452 as a part of its components, such as its firewalls 438B, servers 442B, clients 444G, hubs and routers 448C-D, and the like. As a result, the components of the secondary location 408 may be open to threat attacks, and become potential sources of threats, as well as any mobile enterprise facility clients 444B-F that may be connected to the secondary location's 408 network. In this instance, these components may now unknowingly spread a threat to other connected to the network 402.

Some threats do not come directly from the Internet 454. For example, a physical proximity threat 410 may be deployed on a client device while that device is connected to an unprotected network connection outside the enterprise facility 402, and when the device is subsequently connected to a client 444 on the network 402, the device can deploy the malware or otherwise pose a threat. In embodiments, the endpoint computer security facility 452 may protect the network 402 against these types of physical proximity threats 410, for instance, through scanning any device prior to allowing data transfers, through security validation certificates, through establishing a safe zone within the network 402 to receive data for evaluation, and the like.

Figure 5:
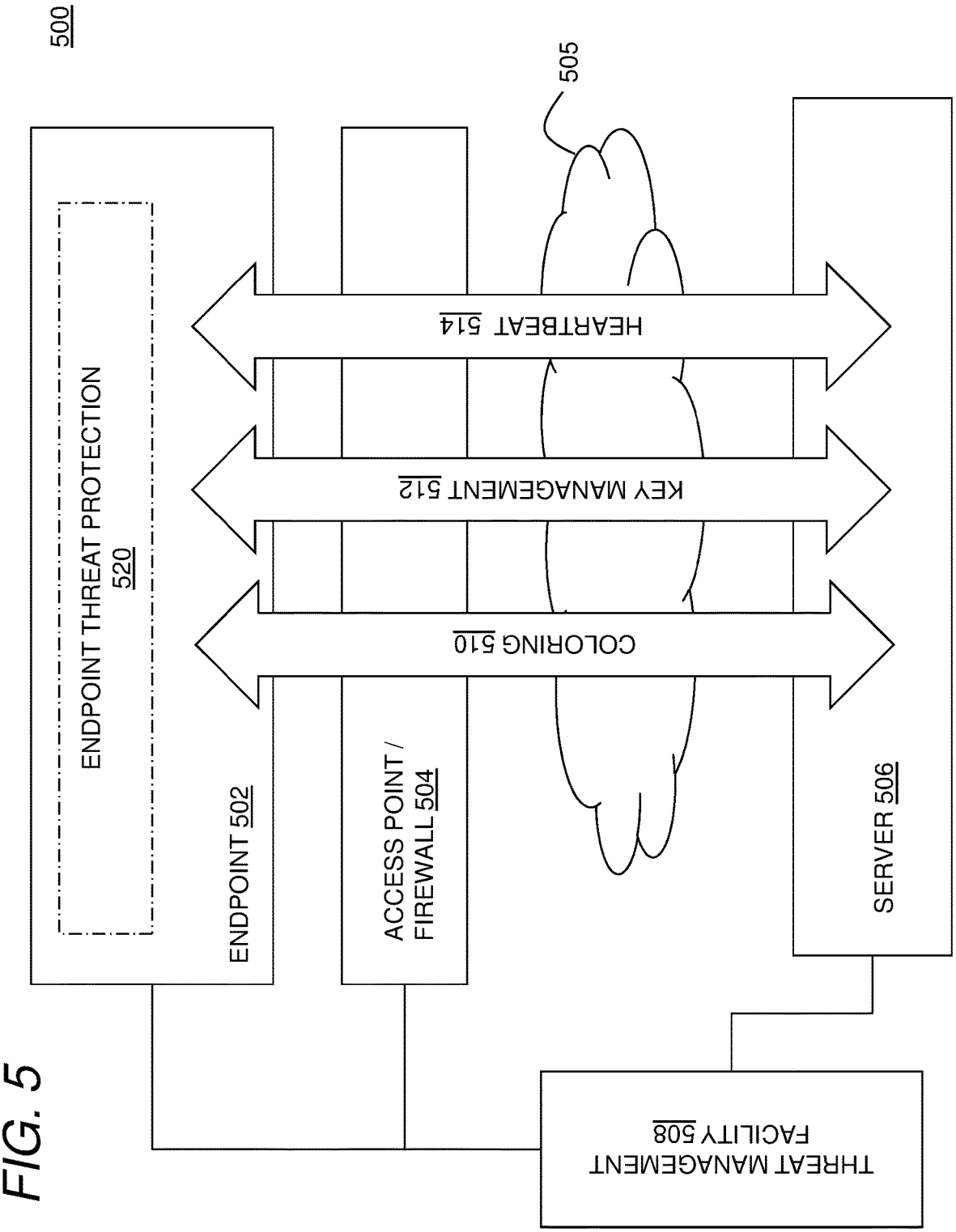
FIG. 5 is a diagram of an exemplary threat management system.

FIG. 5 illustrates an exemplary threat management system 500 as contemplated herein. In general, the threat management system may include an endpoint 502 for example, a laptop, or a device such as an IoT device, an access point 504, a server 506 and a threat management facility 508 in communication with one another directly or indirectly through a data network 505, for example, as generally described above. Each of the entities depicted in FIG. 5, may, for example, be implemented on one or more computing devices such as the computing device described above with reference to FIG. 3.

A number of systems may be distributed across these various components to support threat management, for example, including a coloring system 510, a key management system 512 and a heartbeat system 514, each of which may include software components executing on any of the foregoing system components, and each of which may communicate with the threat management facility 508 or an endpoint threat protection agent 520 executing on an endpoint 502, on an access point or firewall 504, or on a server 506 to support improved threat detection and remediation.

The coloring system 510 may be used to label or 'color' software objects for improved tracking and detection of potentially harmful activity. The coloring system 510 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 512 may support management of keys for the endpoint 502 in order to selectively permit or prevent access to content on the endpoint 502 on a file-specific basis, a process-specific basis, an application-specific basis, a user-specific basis, or any other suitable basis in order to prevent data leakage, and in order to support more fine-grained and immediate control over access to content on the endpoint 502 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 514 may be used to provide periodic or aperiodic information from an endpoint about system health, security, status, etc. A heartbeat may be encrypted or plaintext, or some combination of these, and may be communicated unidirectionally (e.g., from the endpoint 502 to the threat management facility 508) or bidirectionally (e.g., between the endpoint 502 and the server 506, or any other pair of system components) on a useful schedule.

In implementations, the access point or firewall 504 may use the heartbeat 514 to report a potential or actual compromise of a device based, for example, on a color of the device, or based on one or more reliability index values, the meeting of one or more reliability index thresholds, the rate of change of one or more reliability index values, etc. The heartbeat 514 from the access point 504 may be communicated to a server 506, for example, and administrative server or directly or indirectly to a threat management facility 508. If the endpoint device 502 has an endpoint threat protection facility 520, the facility 520 may be used to further investigate the status, or to take remedial measures, again by communication using the secure heartbeat 514.

In general, these various monitoring and management systems may cooperate to provide improved threat detection and response. For example, the coloring system 510 may be used to evaluate when a particular device is potentially compromised, and a potential threat may be confirmed based on an interrupted heartbeat from the heartbeat system 514. The key management system 512 may then be used to revoke keys to a process so that no further files can be opened, deleted or otherwise modified. More generally, the cooperation of these systems enables a wide variety of reactive measures that can improve detection and remediation of potential threats to an endpoint.

In some implementations, the coloring 510 and/or the heartbeat 514 may be used to assign a device to a VLAN. In some implementations, information about the status of the device, for example, health status, may be provided by a security module, and the status of the device may be used to assign the device to VLAN. For example, the endpoint threat detection 520 may monitor the device. A change in health status as reported by the threat detection 520 may be used to request that an access point 502 assign or reassign a device to a VLAN. For example, a device that meets security requirements may continue to use or may be assigned to a particular VLAN and a device that has one or more flagged security issues, such as software that is not up to date, a modified operating system, identified malware, etc., may be assigned or reassigned to another VLAN. The heartbeat 514 may be used as a secure communication channel to report the status of the endpoint.

In some implementations, the access point 504 may receive status information from the endpoint, and assign or reassign the endpoint 502 to the VLAN based on the status information. In some implementations, the server 506 or the threat management facility 508 may receive information about the endpoint 502 and direct the wireless access point to assign or re-assign the endpoint 502 to a VLAN. In some implementations, the threat management facility 508 may direct the endpoint 502 to a VLAN without the cooperation of the access point, or by notifying the access point 504 and the endpoint 502 of the change at the same time.

In some implementations, in connection with the assignment or reassignment of an endpoint 502 to a VLAN, the threat management facility 508 or the server 506 provides an authentication credential to the endpoint 502, which the endpoint can, in turn, present to the access point 504 for VLAN access.

In some implementations, an access point or firewall 504 may color the endpoint 502 based at least in part on activity or behavior of the endpoint 502. The coloring may be used by the access point or firewall 504 to assign or reassign the endpoint to VLAN. For example, if a color that indicates a potential compromise is assigned to the endpoint 502, the endpoint may be assigned or reassigned to a VLAN. Likewise, the assignment to a VLAN may be used as a color to consider the behavior of the VLAN in context.

Figure 6:
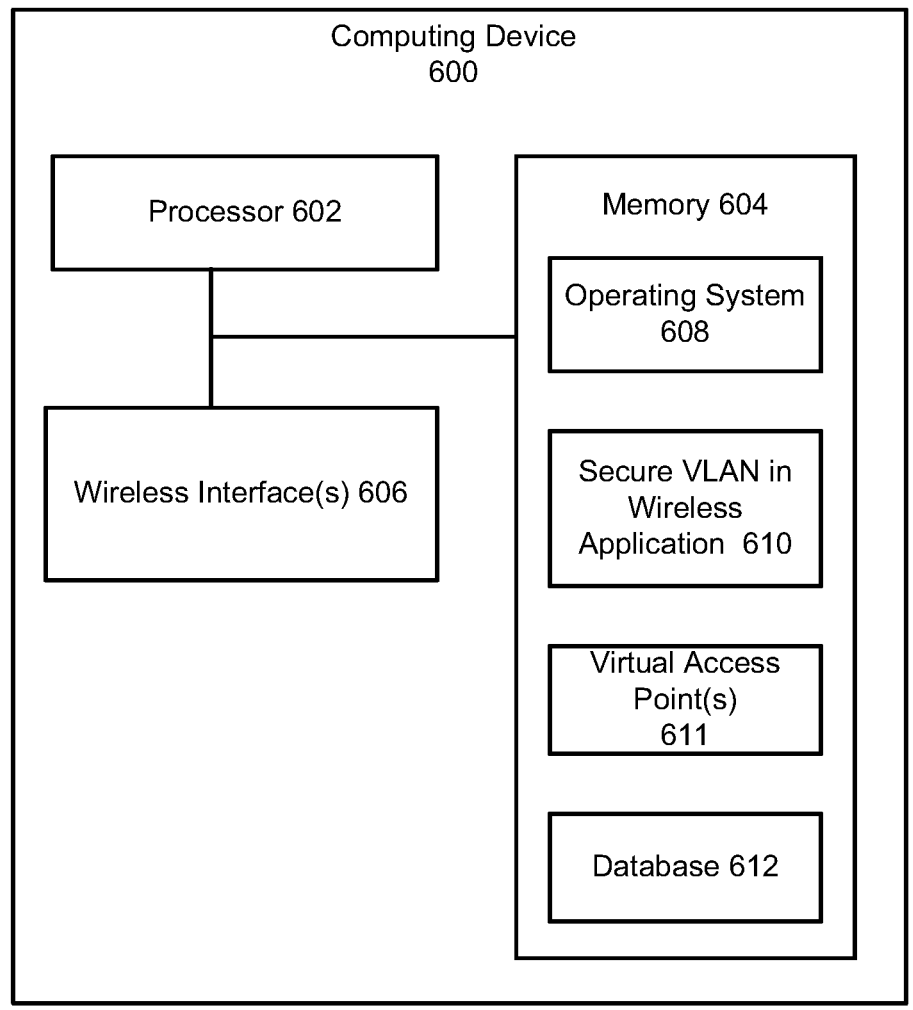
FIG. 6 is a diagram of an example computing device configured for secure VLAN within a wireless network in accordance with at least one implementation.

FIG. 6 is a diagram of an example computing device 600 in accordance with at least one implementation. The computing device 600 includes one or more processors 602, nontransitory computer readable medium or memory 604, I/O interface devices 606 (e.g., wireless communications, etc.) and a network interface 608. The computer readable medium 604 may include an operating system 608, a secure VLAN application 610 for providing a secure VLAN within a wireless network and a data section 612 (e.g., for storing VLAN data, etc.).

In operation, the processor 602 may execute the application 610 stored in the computer readable medium 604. The application 610 may include software instructions that, when executed by the processor, cause the processor to perform operations for a secure VLAN in a wireless network in accordance with the present disclosure (e.g., performing one or more of 202-222 and/or 302-316 described above).

The application program 610 may operate in conjunction with the data section 612 and the operating system 608. The device 600 may communicate with other devices (e.g., a wireless access point) via the I/O interfaces 606.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for secure VLAN in wireless networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

What is claimed is:

1. A method, comprising:
    receiving, at a wireless device, an authentication request from a client device;
    performing, at the wireless device, an authentication of the client device based on the authentication request;
    transmitting, from the wireless device to the client device, a response to the authentication request;
    receiving, at the wireless device, an association request from the client device;
    transmitting, from the wireless device to the client device, a response to the association request;
    assigning, at the wireless device, the client device to a virtual network;
    determining, at the wireless device, whether a group temporal key (GTK) has been previously established for the virtual network, wherein determining whether the GTK has been previously established comprises performing a search of the wireless device for the GTK, and wherein the GTK is used to encrypt communication between devices on the virtual network;
    in response to a determination that the GTK has been previously established for the virtual network, providing the GTK to the client device; and
    in response to a determination that the GTK has not been previously established for the virtual network, establishing a new GTK and after the establishing, providing the new GTK to the client device.

2. The method of claim 1, wherein the wireless device is an access point.

3. The method of claim 1, wherein the authentication includes an extensible authentication protocol sequence.

4. The method of claim 1, wherein the virtual network includes a virtual local area network.

5. A wireless device, comprising:
    one or more processors; and
    a nontransitory computer readable medium coupled to the one or more processors, the nontransitory computer readable medium having stored thereon software instructions that, when executed by the one or more processors, causes the one or more processors to perform operations including:
    receiving, at the wireless device, an authentication request from a client device;
    performing, at the wireless device, an authentication of the client device based on the authentication request;
    transmitting, from the wireless device to the client device, a response to the authentication request;
    receiving, at the wireless device, an association request from the client device;

transmitting, from the wireless device to the client device, a response to the association request;
assigning, at the wireless device, the client device to a virtual network;
determining, at the wireless device, whether a group temporal key (GTK) has been previously established for the virtual network, wherein determining whether the GTK has been previously established comprises performing a search of the wireless device for the GTK, and wherein the GTK is used to encrypt communication between devices on the virtual network;
in response to a determination that the GTK has been previously established for the virtual network, providing the GTK to the client device; and
in response to a determination that the GTK has not been previously established for the virtual network, establishing a new GTK and after the establishing, providing the new GTK to the client device.

6. The wireless device of claim 5, wherein the wireless device is an access point.

7. The wireless device of claim 5, wherein the authentication includes an extensible authentication protocol sequence.

8. The wireless device of claim 5, wherein the virtual network includes a virtual local area network.

9. The method of claim 1, wherein establishing the new GTK comprises deriving the new GTK based on a group master key (GMK).

10. The method of claim 9, wherein deriving the new GTK comprises deriving the new GTK with a size based on a cipher suite associated with the virtual network.

11. The method of claim 1, further comprising receiving from the client device an encrypted message that is encrypted using one of: the GTK and the new GTK.

12. The wireless device of claim 5, wherein establishing the new GTK comprises deriving the new GTK based on a group master key (GMK).

13. The wireless device of claim 12, wherein deriving the new GTK comprises deriving the new GTK with a size based on a cipher suite associated with the virtual network.

14. The wireless device of claim 5, wherein the operations further comprise receiving from the client device an encrypted message that is encrypted using one of: the GTK and the new GTK.

* * * * *